July 25, 1944.   M. B. SAWYER   2,354,551
ELECTROMAGNETIC APPARATUS AND METHOD OF MAKING THE SAME
Filed April 5, 1941

Marion B. Sawyer
INVENTOR.

BY
ATTORNEY.

Patented July 25, 1944

2,354,551

UNITED STATES PATENT OFFICE 2,354,551

ELECTROMAGNETIC APPARATUS AND
METHOD OF MAKING THE SAME

Marion B. Sawyer, Los Angeles, Calif., assignor to Sawyer Electrical Mfg. Co., Los Angeles, Calif., a corporation of California Application April 5, 1941, Serial No. 386,970

4 Claims. (Cl. 171—252)

This invention relates to electromagnetic apparatus and method of making the same, and more particularly to the construction of motor stators and their windings.

In many instances where induction motors of relatively small diameter and considerable length are desired, difficulty has been encountered in winding the stator. In such motors it is not unusual to have a stator from seven to ten inches long and less than an inch and a half in total diameter. The difficulty of winding the stator where the slots for receiving the winding are on the inside surface facing the rotor has resulted in such motors being expensive to manufacture and in some instances has prevented the making of motors of the desired size.

The principal object of the present invention is to provide a method of constructing a magnet where the winding slots in the finished core are relatively inaccessible and in which the winding operation is greatly facilitated.

Another object is to provide a construction for a stator in which the slots for receiving the winding are on the outside at the time of winding and in which the pole pieces intermediate the winding and the armature or rotor are separated as in standard construction.

Other objects and advantages of the invention will appear hereinafter in connection with the description of the preferred embodiment of the invention illustrated in the accompanying drawing and of the method of making the same.

Figure 1:
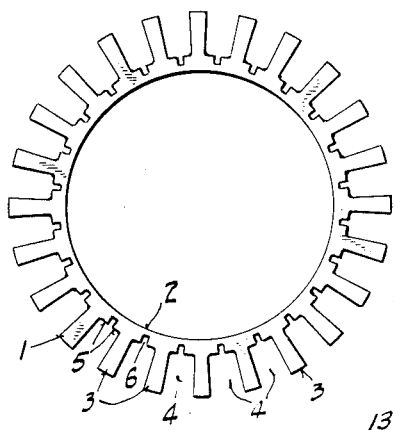
Figure 1 is a plan view of a stator lamination after blanking from a metal sheet.

The laminations of the stator are stamped from metal sheets by dies which cut the laminations in the form illustrated in Figure 1. The lamination 1 has a continuous inner circle 2 with outwardly projecting radial tongues 3 defining outwardly open slots 4 for receiving the stator winding. The bottoms of the slots 4 are closed by the circle 2 and have inner lips 5 separated by a central radial slot 6 adjacent the circle.

Figure 2:
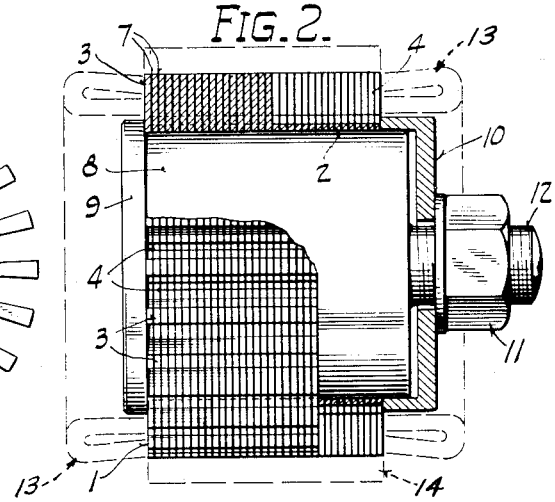
Fig. 2 is a side elevation partly in section on different lines showing a plurality of stator laminations assembled and clamped together ready for winding.
Figure 3:
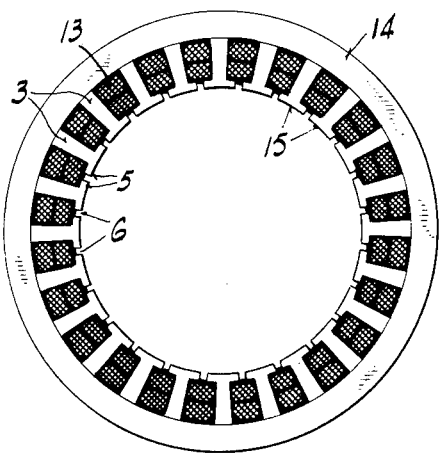
Fig. 3 is a transverse section of the completed stator.
Figure 4:
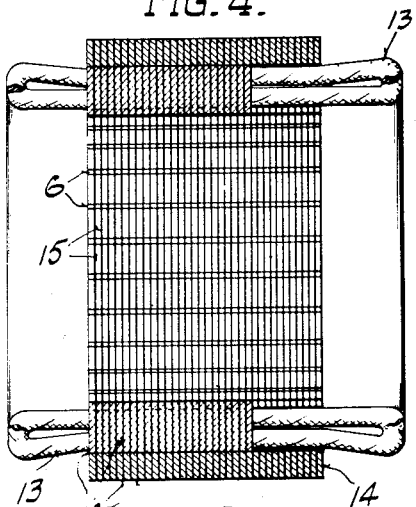
Fig. 4 is a longitudinal section with parts broken to show the winding of the completed stator.
Figure 5:
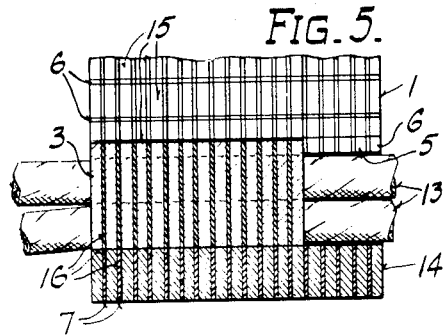
Fig. 5 is a detail enlarged section.

Referring to Fig. 2, after the laminations are cut out, they are assembled with similarly shaped thin sheets of paper 7 therebetween on the mandrel 8 which forms the body of a clamp for holding the laminations together during winding and subsequent impregnation.

The clamp comprises a flange 9 on one end of mandrel 8 and against which the stator laminations are assembled and then pressed by a movable head 10 held in clamping position by the nut 11 on the threaded extension 12 at the other end of mandrel 8.

After assembling and clamping the laminations on the mandrel, the winding is applied. When the slots 4 are filled with the winding 13, an outer cylindrical magnetic core 14 of metal is applied to close the slots and provide the magnetic body of the stator.

The core 14 preferably consists of many sheets of laminations of magnetically permeable metal fitting tightly on the outside of the laminations 1 and winding 13. The laminations of core 14 extend outwardly as far as required to build up a magnetic core of the necessary flux carrying capacity for the stator. In applying core 14 its laminations are pressed over the laminations 1 to contact therewith. Paper is preferably disposed between the laminations of core 14 and the laminations are clamped together.

Figure 6:
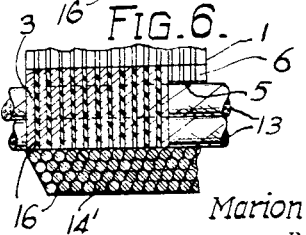
Fig. 6 is a detail enlarged section similar to Fig. 5 and illustrating a modification of the outer core of the stator.

Instead of employing laminations for core 14, the core may be made up of fine wire wound around the stator until the required flux capacity is provided as illustrated at 14' in Fig. 6.

After the core 14 is applied and, if desired, at intermediate stages of its assembly as above described, the stator, while clamped, is submitted to an impregnation process similar to that set forth in my co-pending application Serial No. 231,221, filed September 22, 1938, whereby the interstices between the windings, the laminations and the core elements are filled with insulating di-electric material 16. Impregnation of the stator is followed by baking after which the stator is removed from the mandrel 8.

The final step in completing the stator is the grinding or cutting away of the circle 2 of the laminations to expose the lips 5 and slots 6 on the inside surface thereby providing pole pieces or teeth 15 facing the rotor. The completed stator has much of the same inside appearance as a regular stator wound from the inside.

In the construction, the parts are held together solely by the di-electric material 16, and there are no rivets necessary. This makes it possible to make larger slots 4 than would otherwise be employed, giving more space for winding and providing a stronger motor for a given size of stator. Whenever the term "stator" is employed herein it will be understood that the outer cylindrical member of a dynamo-electric machine is included whether such member is the stationary field as in ordinary motors or whether it might rotate in certain types of construction.

The invention may have various embodiments within the scope of the accompanying claims.

The invention is claimed as follows:

1. The method of making a dynamo-electric machine stator, comprising stamping like core lamination rings having slots open on the outside to receive the magnet windings and having the teeth on the inside temporarily integrally joined together, assembling a plurality of said laminations to provide a core, inserting a winding in said slots from the outside, impregnating the stator with a di-electric insulating material to secure the same together, and thereafter permanently separating the teeth on the inside.

2. The method of making a dynamo-electric machine stator, comprising stamping like core lamination rings having slots open on the outside to receive the magnet windings and having the teeth on the inside joined by a temporary ring of metal integral therewith, assembling a plurality of said laminations to provide a core, inserting a winding in said slots from the outside, wrapping said core and winding with a layer of magnetically permeable wire to provide a flux path on the outside of said stator, impregnating the stator with a di-electric insulating material to secure the same together, and thereafter removing said temporary ring to permanently separate the teeth on the inside.

3. The method of making a dynamo-electric machine stator, comprising stamping like core lamination rings having slots open on the outside to receive the magnet windings and having the teeth on the inside temporarily integrally joined together, assembling a plurality of said laminations to provide a core, inserting a winding in said slots from the outside, covering said core with a series of magnetically permeable laminations to provide a flux path on the outside of said stator, impregnating the stator with a dielectric insulating material to secure the same together, and thereafter permanently separating the teeth on the inside.

4. The method of making a dynamo-electric machine stator, comprising stamping like core lamination rings having slots open on the outside to receive the magnet windings and having the teeth on the inside temporarily integrally joined together, assembling a plurality of said laminations to provide a core, inserting a winding in said slots from the outside, applying an additional core member to the outside of the structure to provide a path for magnetic flux on the outside of the stator, impregnating the stator with a dielectric insulating material to secure the same together, and thereafter permanently separating the teeth on the inside.

MARION B. SAWYER.